(12) United States Patent
Kuo

(10) Patent No.: US 7,259,910 B2
(45) Date of Patent: Aug. 21, 2007

(54) FOCAL DEVICE FOR A TELESCOPE

(76) Inventor: Paul Kuo, 3F-1, No. 367, Dongsing Road, Tainan (TW) 701

( * ) Notice: Subject to any disclaimer, the term of this patent is extended or adjusted under 35 U.S.C. 154(b) by 121 days.

(21) Appl. No.: 11/166,999

(22) Filed: Jun. 23, 2005

(65) Prior Publication Data

US 2006/0291047 A1    Dec. 28, 2006

(51) Int. Cl.
*G02B 23/12* (2006.01)
(52) U.S. Cl. ............... 359/426; 359/425; 359/399
(58) Field of Classification Search .......... 359/425, 359/399, 410, 426, 693, 694, 698, 705, 706
See application file for complete search history.

(56) References Cited

U.S. PATENT DOCUMENTS 3,051,045 A * 8/1962 Misuraca ............... 359/425

\* cited by examiner

*Primary Examiner*—Stephone B. Allen
*Assistant Examiner*—Joshua L Pritchett
(74) *Attorney, Agent, or Firm*—Bacon & Thomas, PLLC

(57) ABSTRACT

A focal device for a telescope includes an eyepiece tube, a main body, a fixing washer, a direction restricting member, a focus adjusting ring, a focus adjusting tube, an eyepiece, an eyepiece clamping member and a tightening ring. The eyepiece-clamping member is fixed with the eyepiece and with the focus adjusting tube, having male threads at the other end. The focus adjusting tube and the eyepiece have the same axial line and are able to shift axially only for restricted by the direction-restricting member. The focus adjusting ring engages with the focus adjusting tube, having the same axial line as the focus adjusting tube does, limited to rotate at its site for activating the focus adjusting tube to shift axially. All the axial lines of the eyepiece and the telescope overlap with each other, enabling focusing absolutely precise.

3 Claims, 7 Drawing Sheets

FOCAL DEVICE FOR A TELESCOPE

BACKGROUND OF THE INVENTION

1. Field of the Invention

This invention relates to a focal device for a telescope, particularly one able to keep the axial lines of the ocular and the telescope aligned to obtain an absolutely precise focus by adjusting the focus.

2. Description of the Prior Art

A focal device of the conventional telescope, as shown in FIGS. 1-3, has a structure that, having not been improved any until now, has an eyepiece connecting tube 11, and an eyepiece 12 fitted at the front end of the combining tube 11 of an eyepiece tube 10. The conjunction of the eyepiece tube 10 and the eyepiece connecting tube 11 counts on a rack 110, set on the bottom of the eyepiece connecting tube 11 and meshing with a gear 100 set on the bottom of the eyepiece tube 10. Then the gear 10 is activated by a rotary wheel 101 to rotate at its site, as shown in FIG. 2. So, when the focus is to be carried out, we need only to rotate the rotary wheel 101 that can activate the gear 100 to drag the rack 110 to move to and fro, making the ocular connecting tube 11 and the ocular 12 move together synchronously. The conventional focal device, though able to keep the ocular connecting tube 11 and the ocular 12 moving to and fro, has a practical defect, unable to adjust the focus precisely. The reason is described as below:

The precision of focusing is dependent on if the telescope axial line (A) overlaps totally with the ocular axial line (B) or not. As the meshing position between the eyepiece connecting tube 11 and the gear 100 locates below the telescope axial line (A) and the eyepiece line (B) the supporting pivotal point of the eyepiece connecting tube 11 and the gear 100 are below the two axial lines (A), and (B), the eyepiece axial line (B) always remains bias, not overlapping totally with the telescope axial line (A) despite rotating the gear wheel 100 to move forwards, as shown in FIG. 2, or to move backwards, as shown in FIG. 3. Therefore, a precise focus can never be obtained.

SUMMARY OF THE INVENTION

The prime object of this invention is to offer an absolutely precise focal device for a telescope.

The main characteristics of the invention are an eyepiece tube, a main body, a fixing washer, a direction restricting member, a focus adjusting ring, a focus adjusting tube, an eyepiece, an eyepiece clamping member and a tightening ring combined together. The eyepiece-clamping member is fixed with the eyepiece at its one end and with the focus adjusting tube, having male threads on its exterior wall at the other end. The focus adjusting tube and the eyepiece have the same axial line and are able to move along the axial line only for being restricted by the direction restricting member. The focus adjusting ring, possessing female threads to engage with the focus adjusting tube to let it pass through and the same axial line as the focus adjusting tube does, is positioned fixedly to activate the focus adjusting tube to move axially. As all the axial lines of the parts overlap with each other, a precise focus is absolutely obtained.

BRIEF DESCRIPTION OF DRAWINGS

This invention is better understood by referring to the accompanying drawings, wherein.

DETAILED DESCRIPTION OF THE PREFERRED EMBODIMENT

Figure 1:
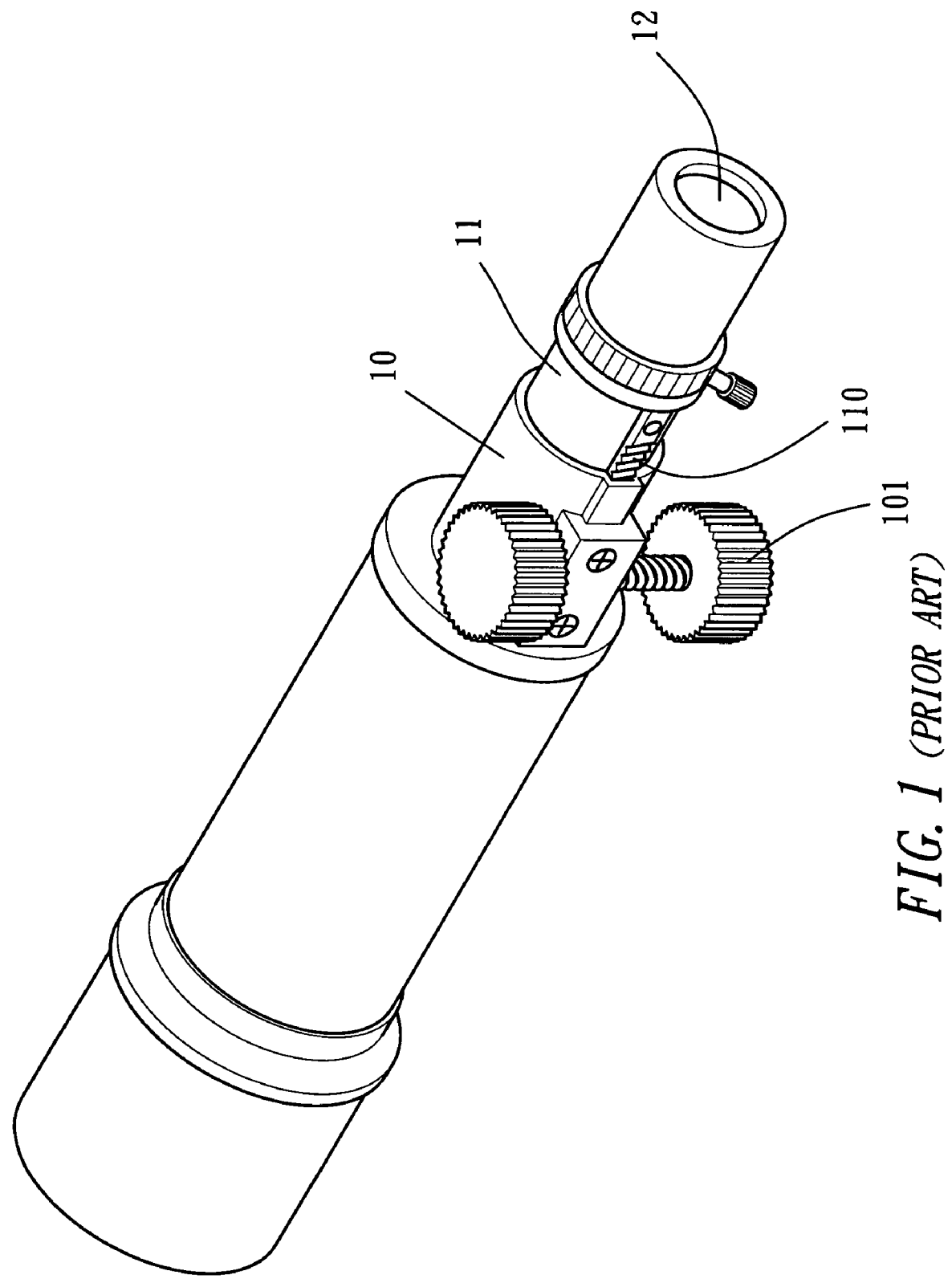
FIG. 1 is a perspective view of a conventional telescope.
Figure 2:
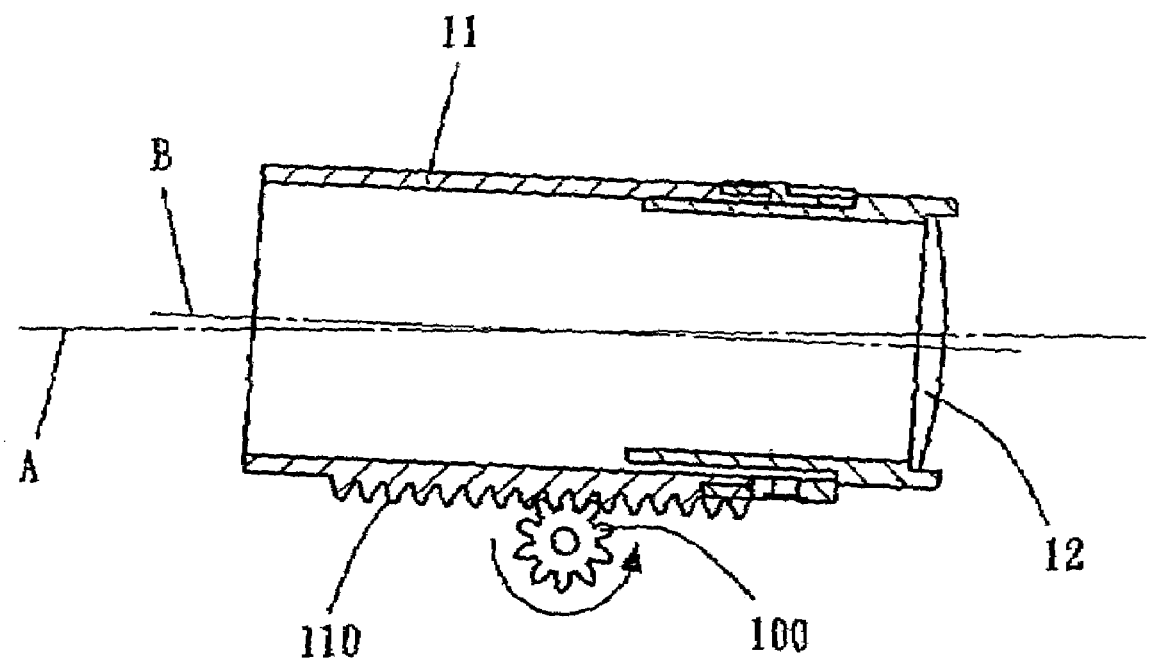
FIG. 2 is a cross-sectional view of a focal adjustment in the conventional telescope.
Figure 3:
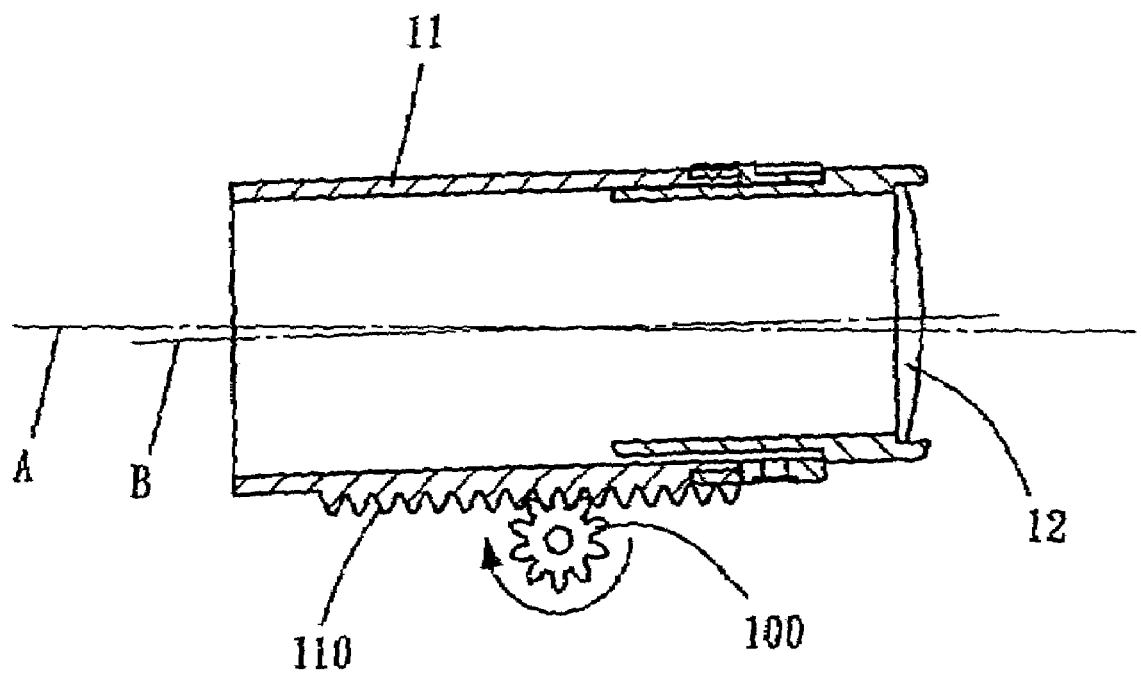
FIG. 3 is another cross-sectional view of the focal adjustment in the conventional telescope.
Figure 4:
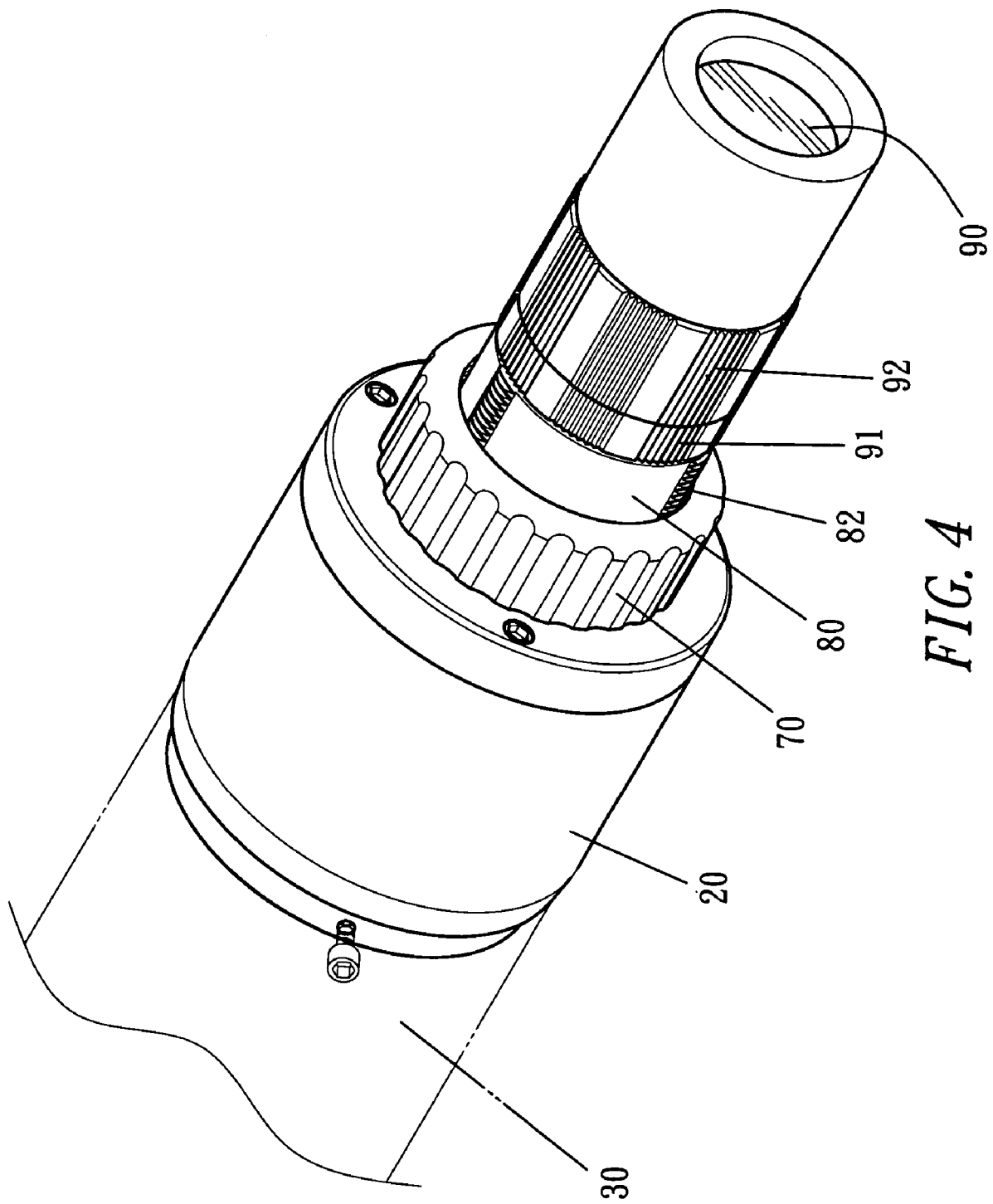
FIG. 4 is a partial perspective view of a telescope in the present invention.
Figure 5:
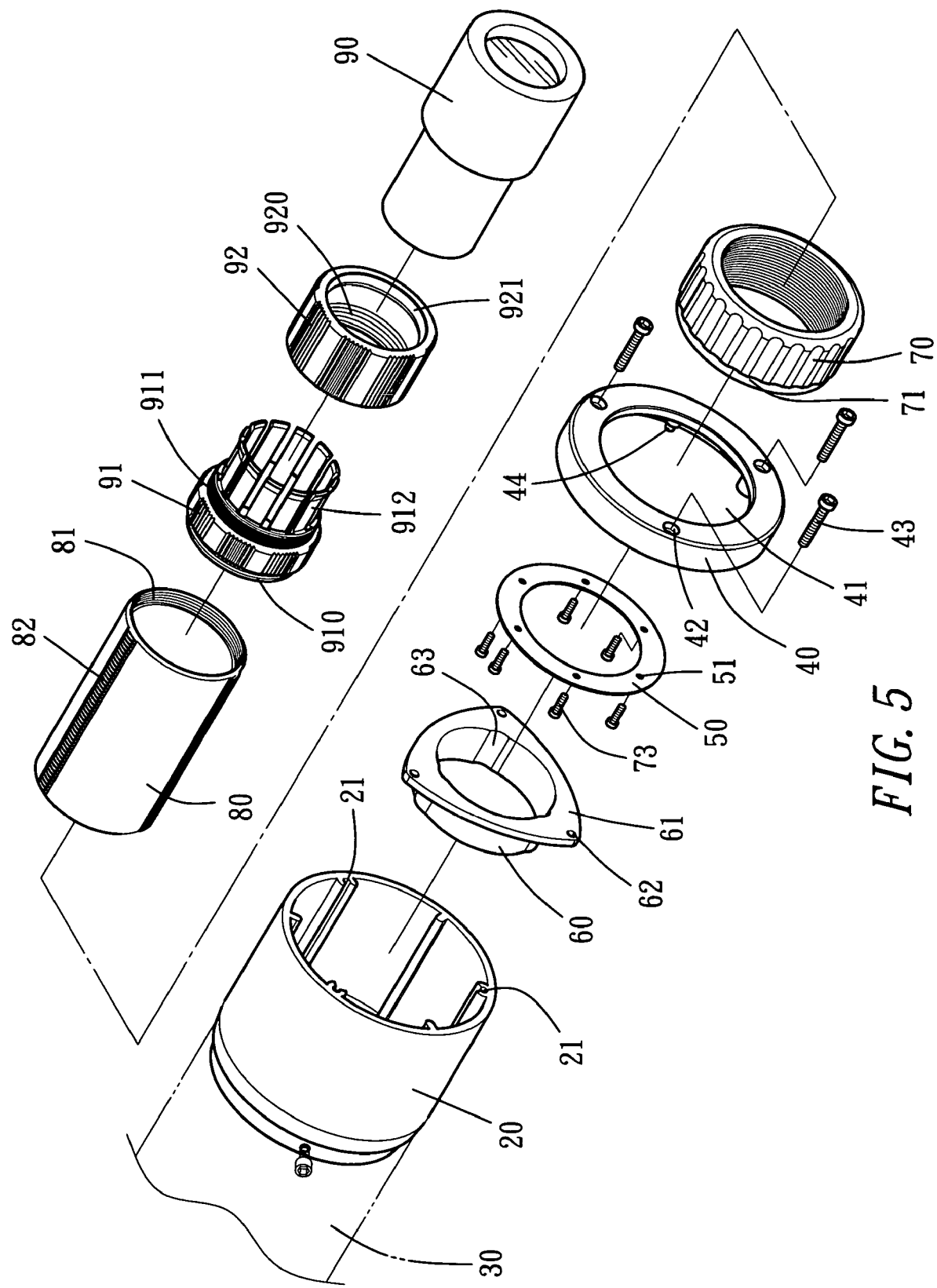
FIG. 5 is an exploded perspective view of a first preferred embodiment of a focal device for a telescope in the present invention.

A first preferred embodiment of a focal device for a telescope in the present invention, as shown in FIGS. 4 & 5, includes an eyepiece tube 20, a main body 40, a fixing washer 50, a direction restricting member 60, a focus adjusting ring 70, a focus adjusting tube 80, an eyepiece 90, an eyepiece clamping member 91 and a tightening ring 92.

The eyepiece tube 20 fixed with an objective lens tube 30 of a telescope at one end and having fixing holes 21 in the inner wall of the other end is cylindrical in shape.

The main body 40 formed as a ring, has an center opening 41, holes 42 located spaced apart around to let bolts 43 pass through to engage with the fixing holes 21 in the eyepiece tube 20, fixing the main body 40 with the eyepiece tube 20, and combining rods 44 extending inwards on the inner side facing the eyepiece tube 20. Set between the combining rods 44 and the opening 41 is an annular surface 45, as shown in FIG. 6, that has plural curved projections 450.

The fixing washer 50 formed as an annular plate is fitted onto the curved projection 450 of the annular surface 45 and has plural holes 51.

Figure 6:
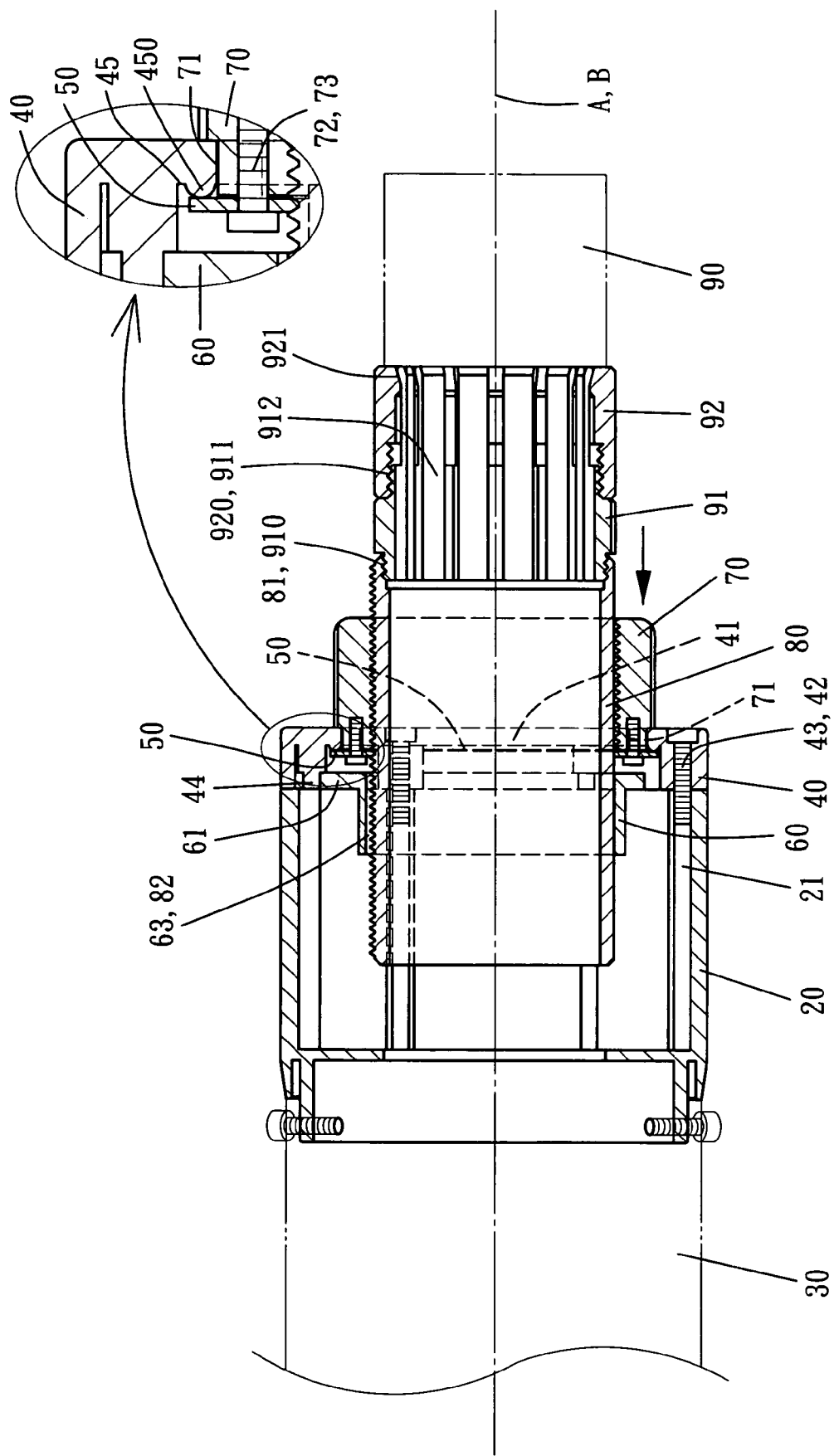
FIG. 6 is a cross-sectioned view of the first preferred embodiment of a focal device for a telescope in the present invention.

The direction restricting member 60 shaped as a hollow body as shown in FIGS. 5 & 6, is located in the main body 40, having a triangle-like annular plate 61 formed in an outer end, possessing three fitting holes 62 to fit with the combining rods 44 on the main body 40 to keep the direction restricting member 60 fixed with the main body. Therefore, the fixing washer 50 confined between the direction-restricting member 60 and the main body 40, cannot shift axially. In addition, the interior wall of the direction-restricting member 60 has several direction restricting grooves 63 cut axially.

The focus adjusting wheel 70, set at the outer side of the main body 40 and formed as a hollow cylinder as shown in FIGS. 5 & 6, has female threads on its interior wall, a shrinking neck 71 at the side facing to the main body 40 and axial threaded holes 72 in the annular surface adjacent to the shrinking neck 71. After the neck 71 extends in the opening 41 of the main body 40, bolts 73 tightly screw the fixing washer 50 with the focus adjusting ring 70 shrinking neck 71 by passing through the holes 51 and the threaded holes 72 to keep the fixing washer 50 and the focus adjusting ring 70 together and rotating as a unit, so that the focus adjusting ring 70 can rotate synchronously with the fixing washer 50 and can't shift axially as the fixing washer 50 can't.

The focus adjusting tube 80, formed cylindrical as shown in FIGS. 5 & 6, passes through the focus adjusting wheel 70, the main body 40, the fixing washer 50 and the direction restricting member 60 with its one end, possessing female threads 81 on the interior wall of the other end. The focus adjusting tube 80 further has three axial projections 82 spaced apart equidistantly on its outer surface, and each axial projection 82 is provided with male threads to engage with the female threads of the focus adjusting ring 70 so the focus adjusting tube 80 may shift axially.

The eyepiece 90, the eyepiece clamping member 91 and the tightening ring 92 are shown in FIG. 5. The eyepiece clamping member 91 formed as a hollow cylinder has male threads 910 at its one end, engaging with the female threads 81 to fix with the focus adjusting tube 80, male threads 911 as well at the other end, and plural clamping pieces 912 spaced apart equidistantly and extending axially from the male threads 911. The tightening ring 92 formed as a hollow cylinder has female threads 920 in the interior wall of the end facing the eyepiece clamping member 91 to engage with the male threads 911 of the ocular clamping member 91 and a tapered annular member 921 extending foreword and corresponding to the end of the clamping pieces 912, controlling the extent of tightness against the clamping pieces 912. The process is to put one end of the eyepiece 90 into the clamping pieces 912 of the ocular clamping member 91 first and, then, to start screwing the tightening ring 92 to squeeze the clamping pieces 912 to tighten up fixedly with the ocular 90.

Figure 7:
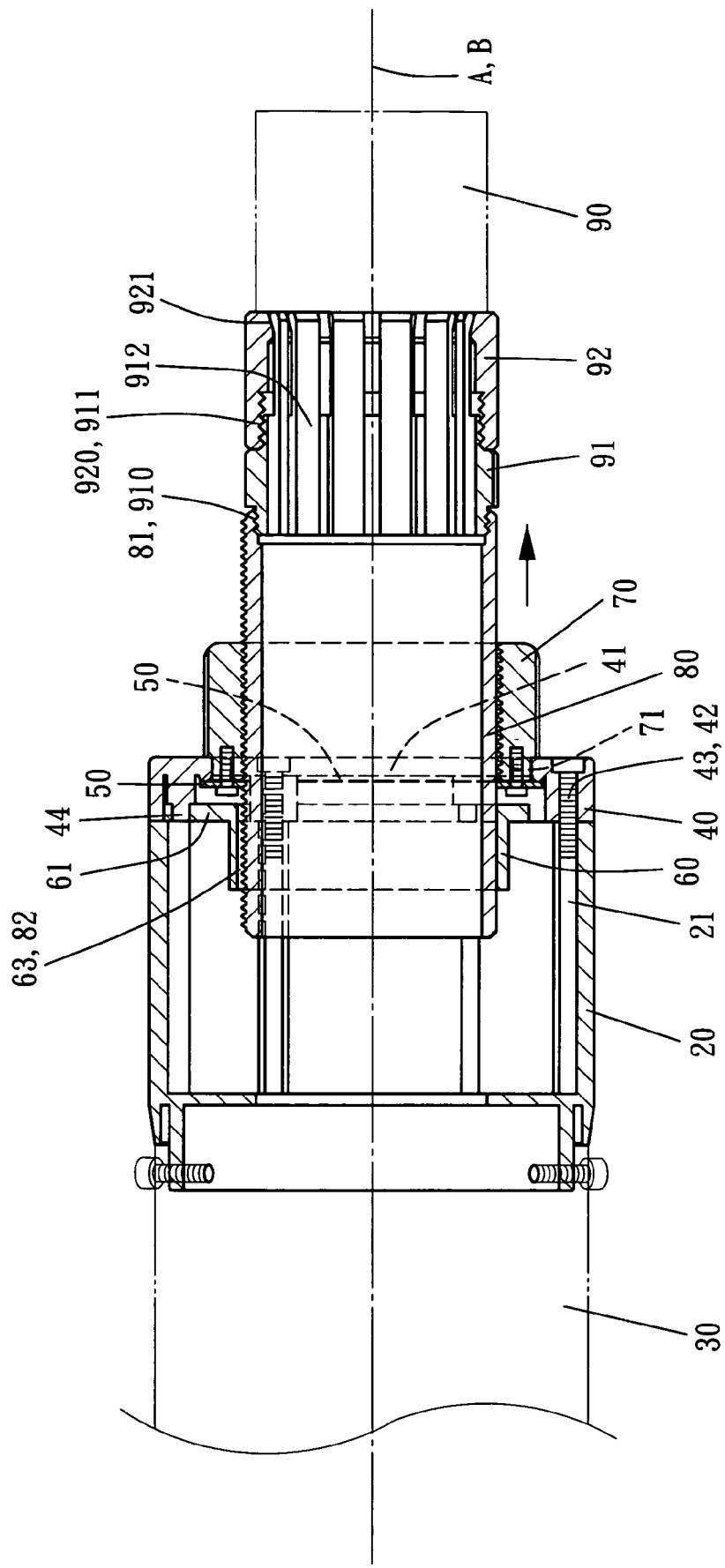
FIG. 7 is another cross-sectioned view of the first preferred embodiment of a focal device for a telescope in the present invention.

As shown in FIGS. 6 & 7, when focusing is to be carried out, it needs only to rotate the focus adjusting ring 70 to and fro, enabling its female threads to engage with the male threads of the curved projections 82 on the focus adjusting tube 80, forcing the focus adjusting tube 80 to shift axially and, as well the eyepiece 90, the eyepiece clamping member 91 and the tightening ring 92 because they are all fixed orderly with the focus adjusting tube 80. And, because it is an axial force when the focus adjusting wheel 70 drags the focus adjusting tube 80 to move axially, the eyepiece axial line (B), before and after adjusting focus, always remains at the same line that totally overlaps with the telescope axial line (A). Therefore, the focus adjustment is very precise and causes no error.

Figure 8:
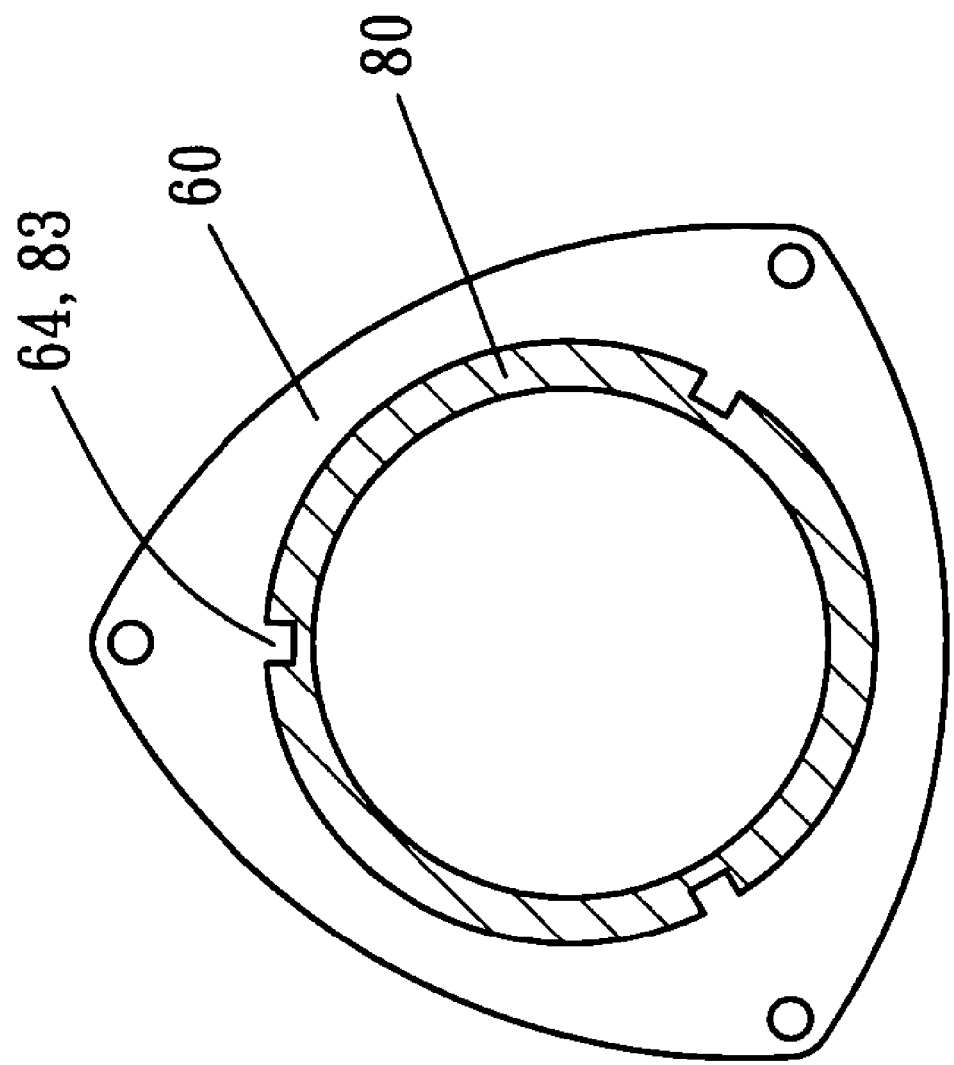
FIG. 8 is a cross-sectioned view of a direction-restricting member in a second preferred embodiment of a focal device for a telescope in the present invention.

A second preferred embodiment of a focal device for a telescope in the invention has an alternation of the direction restricting member 60, as shown in FIG. 8, that has guiding rails 64 extending from its interior wall replacing the direction restricting grooves 63 in the first embodiment. Also, the focus adjusting tube 80 doesn't have the curved projections 82 as the first embodiment does, but make threads fully provided on its exterior wall and direction restricting grooves 83 set axially on its exterior wall for matching with the guiding posts 64. Such a design can keep the focus adjusting tube 80 moving axially but from rotating as the first embodiment cannot.

While the preferred embodiment of the invention has been described above, it will be recognized and understood that various modifications may be made therein and the appended claims are intended to cover all such modifications that may fall within the spirit and scope of the invention.

What is claimed is:

1. A focal device for a telescope comprising:
an eyepiece clamping member tightened by a tightening ring to fix an eyepiece with its one end and a focus adjusting tube fixed with the other end of said eyepiece clamping member;
said focus adjusting tube having male threads on its exterior wall and limited to move axially only by a direction restricting member and able to extend into the inner side of said eyepiece tube with its one end;
a focus adjusting ring formed as a hollow cylinder and having female threads in its interior wall for engaging with said male threads of said focus adjusting tube to let said focus adjusting tube pass through and limit said focus adjusting ring to rotate only and unable to shift axially;
said focus adjusting ring rotated clockwise or counter-clockwise to activate said focus adjusting tube to move axially so that the axial force line may overlap totally with the eyepiece axial line and the telescope axial line to acquire a perfect precise focusing;
wherein said focus adjusting tube possesses plural axial projections spaced apart equidistantly on its exterior surface, each said projection having male threads;
said direction restricting member is fixed in said main body, having direction restricting grooves coordinating to said axial projections respectively so that said focus adjusting tube can only shift axially;
wherein a fixing washer is confined between said main body and said direction restricting member, unable to shift axially, having plural holes spaced apart around; said focus adjusting ring has a shrinking neck at its one end and threaded holes in the annular surface of said shrinking neck, said threaded holes coordinating to said holes of said fixing washer so that bolts can pass through them to keep said fixing washer and said focus adjusting ring fixed together, enabling said focus adjusting ring to rotate only but not shift axially.

2. The focal device for a telescope as claimed in claim 1, wherein
said eyepiece clamping member has male threads at its one end, facing to said eyepiece, plural clamping pieces spaced apart equidistantly and extending axially from said male threads engaging with female threads of said focus adjusting tube;
a tightening ring formed as a hollow cylinder has female threads in the interior wall of its one end, said female threads engaging with said male thread of said eyepiece clamping member, and a tapered ring member is formed in the interior wall of the other end of said tightening ring, for controlling the extent of tightness against said clamping pieces.

3. A focal device for a telescope comprising:
an eyepiece clamping member tightened by a tightening ring to fix an eyepiece with its one end and a focus adjusting tube fixed with the other end of said eyepiece clamping member;
said focus adjusting tube having male threads on its exterior wall and limited to move axially only by a direction restricting member and able to extend into the inner side of said eyepiece tube with its one end;
a focus adjusting ring formed as a hollow cylinder and having female threads in its interior wall for engaging with said male threads of said focus adjusting tube to let said focus adjusting tube pass through and limit said focus adjusting ring to rotate only and unable to shift axially;
said focus adjusting ring rotated clockwise or counter-clockwise to activate said focus adjusting tube to move axially so that the axial force line may overlap totally with the eyepiece axial line and the telescope axial line to acquire a perfect precise focusing;

wherein said focus adjusting tube possesses plural axial projections spaced apart equidistantly on its exterior surface, each said projection having male threads;

said direction restricting member is fixed in said main body, having direction restricting grooves coordinating to said axial projections respectively so that said focus adjusting tube can only shift axially;

wherein a fixing washer is confined between said main body and said direction restricting member, unable to shift axially, having plural holes spaced apart around; said focus adjusting ring has a shrinking neck at its one end and threaded holes in the annular surface of said shrinking neck, said threaded holes coordinating to said holes of said fixing washer so that bolts can pass through them to keep said fixing washer and said focus adjusting ring fixed together, enabling said focus adjusting ring to rotate only but not shift axially;

wherein said direction restricting member has guiding posts extending from its interior wall for matching with direction restricting grooves recessed axially in the exterior wall of said focus adjusting tube, keeping said focus adjusting tube to shift only in the axial direction.

* * * * *